Patented Sept. 9, 1941

2,255,045

UNITED STATES PATENT OFFICE 2,255,045

ANTHRAQUINONE COMPOUNDS

Joseph B. Dickey and John R. Byers, Jr., Rochester, N. Y., assignors to Eastman Kodak Company, Rochester, N. Y., a corporation of New Jersey No Drawing. Application March 31, 1939, Serial No. 265,229

6 Claims. (Cl. 260—379)

This invention relates to anthraquinone compounds and their application for the coloration of organic derivatives of cellulose, particularly textile materials made of or containing an organic derivative of cellulose, by dyeing, printing, stenciling or like method. The invention includes the new anthraquinone compounds and their preparation, the process of dyeing or coloring therewith and materials made of or containing an organic derivative of cellulose colored with said compounds.

It is an object of our invention to provide a new class of anthraquinone compounds.

A further object of our invention is to provide a process for the dyeing or coloring of organic derivatives of cellulose.

A specific object is to provide a process for the dyeing or coloring of materials made of or containing an organic derivative of cellulose wherein the dye is applied directly from an aqueous suspension.

A further object is to produce dyeings on organic derivatives of cellulose which are of good fasteners to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The anthraquinone compounds, by means of which the above named objects are accomplished or made possible, have the general formula:

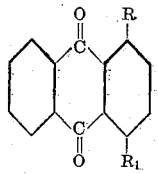

where R represents a member selected from the group consisting of a

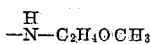

and a

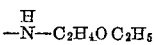

group and wherein $R_1$ represents a member selected from the group consisting of a hydroxy group and a

group, wherein alkyl represents a member selected from the group consisting of a methyl, an ethyl, a propyl, a butyl, a —$C_2H_4OCH_3$ and a —$C_2H_4OC_2H_5$ group.

The anthraquinone compounds of our invention constitute very valuable dyes for the coloration of organic derivatives of cellulose, such as those hereinbefore mentioned, yielding generally blue shades thereon of good fastness to light and washing. They are especially adapted for the dyeing of cellulose acetate silk. By sulfonation of the compounds of our invention, in accordance with known methods for the introduction of a sulfonic acid group into an anthraquinone nucleus, sulfonated dye compounds are obtained which are suitable for the coloration of silk and wool.

The preparation of the anthraquinone compounds of our invention varies depending upon the particular compound desired. Those compounds of our invention containing a β-methoxyethylamino or a β-ethoxyethylamino group in the 1-position and a hydroxy group in the 4-position can be prepared by condensation of one mole equivalent of leuco quinizarin with one mole equivalent of β-methoxyethylamine or β-ethoxyethylamine. Where both the 1 and 4 positions of the anthraquinone nucleus are to be substituted with a β-methoxyethylamino or a β-ethoxyethylamino group, one mole equivalent of leuco quinizarin is condensed with two mole equivalents of β-methoxyethylamine or β-ethoxyethylamine. Where both these group are to be present, condensation may be effected with both amines present or two separate condensations may be carried out, each of the two separate condensations being carried out with but one amine present, whereby condensation is effected with first one and then the other amine. Where a β-methoxyethylamino or a β-ethoxyethylamino group is to be present in the 1 position and a (methyl, ethyl, propyl, or butyl) amino group is to be present in the 4 position the groups may be introduced in one condensation or two separate condensations may be carried out similarly as described above.

Mixtures of leuco quinizarin and quinizarin, instead of leuco quinizarin alone, can likewise be employed in the preparation of the dye compounds of our invention. Similarly, other leuco anthraquinone compounds such as leuco-1-aminoanthraquinone and leuco-1,4-diaminoanthraquinone can be employed.

During our investigation of the compounds of our invention, we have discovered that if a mixture of amines is employed and the ratio of amines to the anthraquinone compound or compounds being condensed therewith is increased from 1:1 to 7:3, for example, a dye mixture having a higher melting point is obtained. Substantially improved dye mixtures also are obtained when the ratio is 6:4. These dye mixtures having increased melting points possess the advantages of being more easily prepared into dispersible mixtures, of dispersing more readily and of having less tendency to conglomerate in the dyebath. By being more readily dispersible and having less tendency to conglomerate evenness of dyeing is promoted. The preparation of these advantageous dye mixtures is described completely hereinafter.

The condensation reactions referred to above may be carried out in water or in the presence of a solvent diluent such as ethanol, butanol or pyridine. The leuco dye compounds formed by the condensation reactions may be oxidized with air or other suitable oxidizing agent, sodium perborate or sodium chlorate, for example, in known fashion to obtain the desired dye compounds.

The following examples illustrate the preparation of the compounds of our invention:

Example 1

7.5 grams of β-methoxymethylamine and 24 grams of leuco quinizarin are dissolved in 250 cc. of boiling pyridine and the resulting mixture is refluxed for six hours. The leuco dye compound formed by this reaction is oxidized to the non-leuco form by passing in air. The desired dye compound can be recovered by concentrating the pyridine solution. It has the probable formula:

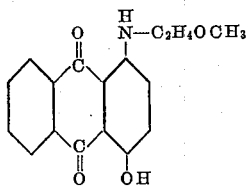

and dyes cellulose acetate silk a reddish purple shade.

Example 2

19 grams of β-ethoxyethylamine, 300 cc. of ethanol and 24 grams of leuco quinizarin are charged into an autoclave and heated at 90–110° C. for twenty hours. The autoclave is then allowed to cool and its contents removed. The leuco dye formed is oxidized with an alkaline aqueous solution of sodium perborate. The dye compound is recovered by filtration, washed with water, and dried. The dye compound obtained has the formula:

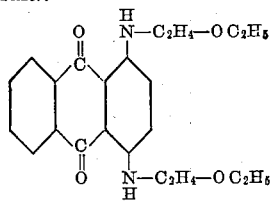

and dyes cellulose acetate silk a blue shade.

Example 3

12 grams of leuco quinizarin, 12 grams of quinizarin, 150 cc. of butanol, 7.7 grams of β-methoxyethylamine and 9 grams of β-ethoxyethylamine are heated together under refluxing conditions for six hours. The mixture resulting is poured into water and the leuco dye compound formed is oxidized by treatment with alkaline sodium perborate, recovered by filtration, washed with water and dried. The dye compound obtained has the formula:

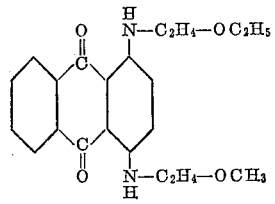

and colors cellulose acetate silk a blue shade.

Similarly, by the substitution of an equivalent weight of methylamine, ethylamine, propylamine or butylamine for β-methoxyethylamine in the above example, dyes containing a β-ethoxyethylamino group in the 1-position and a methylamino, an ethylamino, a propylamino and a butylamino group, respectively, in the 4-position can be obtained.

Example 4

24 grams of leuco-1,4-diaminoanthraquinone, 7.7 grams of β-methoxyethylamine, 150 cc. of butanol and 35 grams of methylamine are heated together under reflux for about five hours. The resulting mixture is worked up as described in Example 3. The dye compound obtained has the probable formula:

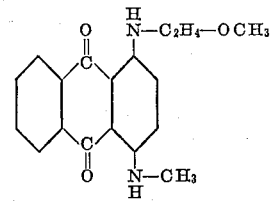

and colors cellulose acetate silk a blue shade.

Similarly, by the substitution of an equivalent weight of ethylamine, propylamine, or butylamine for methylamine in the above example, dyes containing a β-methoxyethylamino group in the 1-position and an ethylamino, a propylamino and a butylamino group, respectively, in the 4-position can be obtained.

Example 5

1.94 grams of leuco quinizarin and 2.88 grams of quinizarin are mixed together and to the resulting mixture are added 0.95 grams of β-methoxyethylamine and 2.73 grams (0.91 gram of methylamine) of an aqueous methylamine solution bulking 93 grams per mole of methylamine together with 20 cc. of n-butyl alcohol. The reaction mixture resulting is refluxed moderately for seven to eight hours and then air is bubbled through the hot reaction mixture for 5–6 hours to oxidize the leuco dye compound formed. The reaction mixture is then poured into one and one-half liters of hot water, steamed and stirred, following which the desired dye mixture is recovered by filtration, washed with water and dried. Analysis of the dye mixture obtained disclosed that it contains the methylamino group and the β-methoxyethylamino group in the ratio of 7 mol parts to 3 mol parts. These groups are present in the 1- and 4-positions of the anthraquinone nucleus. The dye mixture obtained in accordance with this example is excellent for the dyeing of organic derivatives of cellulose such as cellulose acetate silk and yield blue shades thereon.

Example 6

1.94 grams of leuco quinizarin and 2.88 grams of quinizarin are mixed and to the resulting mixture are added 0.54 grams of β-methoxyethylamine and 1.56 grams (0.52 grams of methylamine) of an aqueous methylamine solution bulking 93 grams per mol of methylamine together with 20 cc. of n-butyl alcohol. Reaction and recovery of the dye mixture is carried out as described in Example 5. The dye mixture obtained colors cellulose acetate silk a reddish blue to purple shade.

*Example 7*

To a mixture of 1.94 grams of leuco quinizarin and 2.88 grams of quinizarin in a 125 cc. Erlenmeyer flask fitted with a reflux condenser was added a solution of 2.20 grams of pure methoxyethylamine and 1.17 grams (0.39 grams of methylamine) of an aqueous methylamine solution, bulking 93 grams per mol of methylamine, in 20 cc. of n-butyl alcohol. The flask was stoppered and shaken and allowed to stand for a short time after which it was brought to gentle reflux on a hot plate during one-half hour. The reaction mixture was then refluxed for six hours following which a stream of air was bubbled through the hot reaction mixture for 5 to 6 hours. The air was admitted through a glass tube extending down through the condenser to the bottom of the flask. Following this, the hot reaction mixture was steam distilled to remove butyl alcohol after which the desired dye mixture was recovered by filtration, washed with hot water and air dried. An alternate procedure consists in pouring the hot reaction mixture into one and one-half liters of hot water, stirring until cold and then salting out the dye by the addition of 125 grams of sodium chloride following which the desired dye compound may be recovered by filtration, washed and dried. The dye mixture obtained colors cellulose acetate silk blue shades of excellent fastness to light and washing Analysis discloses that it contains the β-methoxyethylamino group and the methylamine group in the ratio of seven mol parts to three parts. These groups are present in the 1 and 4-positions of the anthraquinone nucleus.

The anthraquinone dye compounds of our invention can be applied to the coloration of organic derivatives of cellulose such as cellulose acetate silk by the well known dispersion method. In accordance with this method of dyeing, the insoluble dye or dye mixture can be first ground to a fine powder, intimately mixed with a suitable dispersing or solubilizing agent following which the resulting mixture is added to water or a dilute solution of soap in water to form an aqueous dyebath. After this known preparation of the dyebath, the textile materials, for example, to be dyed may be added to the dyebath and the dyeing operation conducted in known fashion. Suitable dispersing or solubilizing agents that can be employed include soap, sulphoricinoleic acid, the alkali metal salts of sulphoricinoleic acid, and sulfonated oleic stearic or palmitic acid or salts thereof, such, for example, as the sodium or ammonium salts.

The following example illustrates how dyeing may be carried out in accordance with our invention. Quantities are expressed in parts by weight.

*Example A*

2 parts of the dye compound of Example 2 are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk in the form of yarn or fabric, for example, are added to the dyebath after which the temperature is gradually raised to 80–85° C. and the silk worked at this temperature until dyeing is complete. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a blue shade of excellent fastness to light and washing.

While our invention has been illustrated in connection with the dyeing of cellulose acetate silk, it will be understood that dyeing operations can be carried out in a manner similar to that described above by the substitution of another organic derivative of cellulose material for cellulose acetate silk or by employing dye compounds other than those employed in the example or by substitution of both the material being dyed and the dye compound of the example.

We claim:

1. Anthraquinone compounds having the general formula:

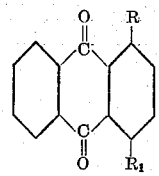

wherein R represents a member selected from the group consisting of a $$-\overset{H}{N}-C_2H_4OCH_3$$

group and a $$-\overset{H}{N}-C_2H_4OC_2H_5$$

group and wherein $R_1$ represents a member selected from the group consisting of a hydroxy group and a $$-\overset{H}{N}-R_2$$

group, wherein $R_2$ represents a member selected from the group consisting of a methyl, an ethyl, a propyl, a butyl, a $-C_2H_4OCH_3$ and a $-C_2H_4OC_2H_5$ group.

2. Anthraquinone compounds having the general formula:

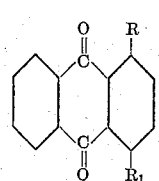

wherein R represents a member selected from the group consisting of a $$-\overset{H}{N}-C_2H_4OCH_3$$

group and a $$-\overset{H}{N}-C_2H_4OC_2H_5$$

group and wherein $R_1$ represents a hydroxy group.

3. Anthraquinone compounds having the general formula:

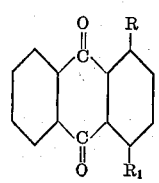

wherein R represents a member selected from the group consisting of a

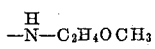

group and a

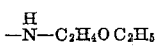

group and wherein $R_1$ represents a

group, wherein $R_2$ represents a member selected from the group consisting of a methyl, an ethyl, a propyl, a butyl, a $-C_2H_4OCH_3$ and a $-C_2H_4OC_2H_5$ group.

4. The anthraquinone dye mixture obtained by oxidation of the product resulting from reaction between a mixture of quinizarin and leuco quinizarin and a mixture of β-methoxyethylamine and methylamine and in which said reactants are present in substantially the following proportions by weight:

|  | Parts |
|---|---|
| Quinizarin | 2.88 |
| Leuco quinizarin | 1.94 |
| β-Methoxyethylamine | 0.95 |
| Methylamine | 0.91 |

5. The anthraquinone dye mixture obtained by the oxidation of the product resulting from reaction between a mixture of quinizarin and leuco quinizarin and a mixture of β-methoxyethylamine and methylamine and in which said reactants are present in substantially the following proportions by weight:

|  | Parts |
|---|---|
| Quinizarin | 2.88 |
| Leuco quinizarin | 1.94 |
| β-Methoxyethylamine | 0.54 |
| Methylamine | 0.52 |

6. The anthraquinone dye mixture obtained by the oxidation of the product resulting from reaction between a mixture of quinizarin and leuco quinizarin and a mixture of β-methoxyethylamine and methylamine and in which said reactants are present in substantially the following proportions by weight:

|  | Parts |
|---|---|
| Quinizarin | 2.88 |
| Leuco quinizarin | 1.94 |
| β-Methoxyethylamine | 2.20 |
| Methylamine | 0.39 |

JOSEPH B. DICKEY.
JOHN R. BYERS, JR.